(12) United States Patent
Zohar et al.

(10) Patent No.: US 11,042,840 B2
(45) Date of Patent: Jun. 22, 2021

(54) SYSTEM AND A METHOD FOR MANAGING INVENTORY

(71) Applicant: Freshub LTD, Petach Tikva (IL)

(72) Inventors: Meir Zohar, Givat Shmuel (IL);
Moshe Rosenblum, Petach Tikva (IL);
Ofer Solomon, Maalot-Tarshicha (IL);
David Kozlovsky, Modi'in (IL); Noam Kronman, Rehovot (IL)

(73) Assignee: FRESHUB LTD, Petach Tikva (IL)

( * ) Notice: Subject to any disclaimer, the term of this patent is extended or adjusted under 35 U.S.C. 154(b) by 369 days.

(21) Appl. No.: 15/814,966

(22) Filed: Nov. 16, 2017

(65) Prior Publication Data
US 2018/0137462 A1 May 17, 2018

Related U.S. Application Data

(60) Provisional application No. 62/423,338, filed on Nov. 17, 2016.

(51) Int. Cl.
G06Q 10/08 (2012.01)
G06Q 30/06 (2012.01)
G06N 20/00 (2019.01)

(52) U.S. Cl.
CPC ......... G06Q 10/0875 (2013.01); G06N 20/00 (2019.01); G06Q 30/0631 (2013.01)

(58) Field of Classification Search
CPC . G06Q 10/0875; G06Q 30/0631; G06N 20/00
See application file for complete search history.

(56) References Cited

U.S. PATENT DOCUMENTS

| | | | |
|---|---|---|---|
| 6,204,763 B1 | 3/2001 | Sone et al. | |
| 6,513,017 B1 | 1/2003 | Howard et al. | |
| 7,584,016 B2 | 9/2009 | Weaver | |
| 9,109,943 B2 | 8/2015 | Mager et al. | |
| 2002/0161652 A1 | 10/2002 | Paullin et al. | |
| 2008/0052201 A1 | 2/2008 | Bodin et al. | |
| 2015/0178654 A1 | 6/2015 | Glasgow et al. | |
| 2016/0217417 A1* | 7/2016 | Ma | H04N 5/225 |
| 2017/0076249 A1* | 3/2017 | Byron | G06N 20/00 |
| 2018/0053140 A1* | 2/2018 | Baca | G06Q 10/087 |
| 2019/0087769 A9* | 3/2019 | Glasgow | G06Q 10/087 |

FOREIGN PATENT DOCUMENTS

EP 2306129 A1 * 4/2011 ............ F25D 29/00

* cited by examiner

Primary Examiner — A. Hunter Wilder
Assistant Examiner — Joseph M Mutschler
(74) Attorney, Agent, or Firm — Michael J. Feigin, Esq.; Feigin and Fridman LLC

(57) ABSTRACT

There are provided methods and systems for managing inventory of inventory items in a storage area, and for automatically carrying out an action in response to a change in at least one inventory item in the storage area.

17 Claims, 2 Drawing Sheets

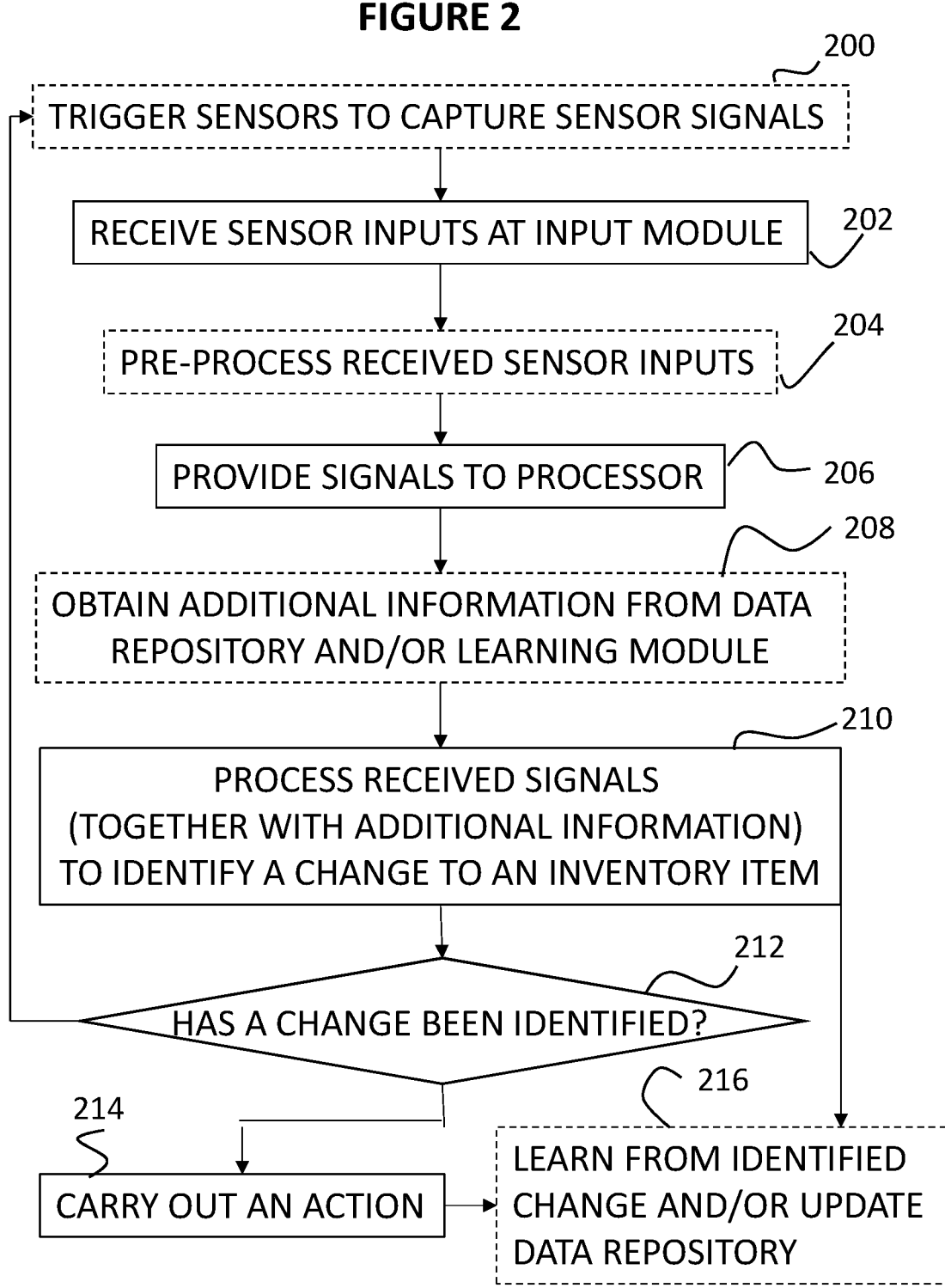

SYSTEM AND A METHOD FOR MANAGING INVENTORY

RELATED APPLICATION

The present application gains priority from U.S. Provisional Patent Application 62/423,338, filed 17 Nov. 2016 and entitled "A System and a Method for Tracking Inventory Using Sensors and Computer Vision Techniques" which is incorporated herein by reference as if fully set forth herein.

FIELD AND BACKGROUND OF THE INVENTION

The invention, in some embodiments, relates to the field of managing inventory, and more particularly to methods and systems for automatically tracking inventory and consumption rates of inventory items and carrying out one or more actions based on identified changes in inventory.

In many homes and businesses, the quantity of different products, or inventory items, needs to be tracked in order to determine which items need to be replenished and should be purchased, and for which items there is a sufficient quantity, so as to ensure proper stocking of the home or business and to prevent waste. Such determination is often time consuming, and is prone to errors.

The ability to gauge inventory levels automatically, without user interaction, is complex, as it requires an identification of a package of a product within a storage area and monitoring of a quantity of the product within the package. This requires an understanding of the dimensions and contents of packages, which have posed a significant challenge to developers to date.

Additionally, one of the actions users perform when checking inventory, is determining the usability of the remaining product—for example, when users check whether they need to buy milk, they typically check not only how much milk they have, but also when that milk will expire, or how long that milk will be usable. As such, an automatic system must also determine whether or not the identified product is usable, or for how long the product will remain useable, in order to determine the effective inventory of the product.

There is thus a need in the art for an inventory gauging system and method which automatically identifies an inventory item, gauges its effective inventory by determining the available quantity and the usability of that quantity of the inventory item, and carries out an action, such as purchasing the inventory item, reminding the user to discard an inventory item, or providing an advertisement for a corresponding inventory item, in response to identification of the effective inventory.

SUMMARY OF THE INVENTION

Some embodiments of the invention relate to methods and systems for managing inventory, such as identifying inventory items in a storage area, gauging an effective quantity or inventory of the inventory items or a change in the inventory items, and carrying out an action in response to such gauging.

In accordance with a first aspect of the present invention, there is provided a method for managing inventory in a storage area of a user, the storage area housing at least one inventory item and having a plurality of sensors associated therewith, the method including:

receiving at least a first input signal from a first sensor of the plurality of sensors and a second input signal from a second sensor of the plurality of sensors, the first sensor and the second sensor being sensors of different types and the first input signal and the second input signal being signals of different types;

processing first and second signals, based on the first and second input signals, respectively, together with user-specific information learned over time using machine-learning techniques to identify a change in at least one inventory item in the storage area;

based on the identified change, carrying out at least one action, the at least one action including at least one of:
 adding the at least one inventory item to an inventory replenishment list;
 removing the at least one inventory item from an inventory replenishment list;
 updating a data repository to reflect the change to the at least one inventory item;
 purchasing the at least one inventory item;
 predicting a time at which the at least one inventory item will expire;
 predicting a time at which the at least one inventory item will be consumed;
 providing to the user an advertisement for an inventory item corresponding to or useable instead of the at least one inventory item;
 providing to the user an indication that the at least one inventory item has expired; and
 providing to the user a recommendation to discard or to add the at least one inventory item.

In some embodiments of the first aspect, at least the first signal is selected from the group consisting of:
 a photospectrometry input signal;
 a raman spectrometry input signal;
 a material oscillation measurement signal;
 a magnetic resonance measurement signal;
 a kinetic wave decay signal;
 an ultrasonic signal; and
 a chemical signal.

In accordance with a second aspect of the present invention, there is provided a method for managing inventory in a storage area, the storage area housing at least one inventory item and having a plurality of sensors associated therewith, the method including:

receiving a first input signal from a first sensor of the plurality of sensors and a second input signal from a second sensor of the plurality of sensors;

processing first and second signals, based on the first and second input signals, respectively, to identify a change in at least one inventory item in the storage area;

based on the identified change, carrying out at least one action, wherein the first input signal is selected from the group consisting of:
 a photospectrometry input signal;
 a raman spectrometry input signal;
 a material oscillation measurement signal;
 a magnetic resonance measurement signal;
 a kinetic wave decay signal;
 an ultrasonic signal; and
 a chemical signal, and based on the identified change, carrying out at least one action, the at least one action including at least one of:
 adding the at least one inventory item to an inventory replenishment list;

removing the at least one inventory item from an inventory replenishment list;
updating a data repository to reflect the change to the at least one inventory item;
purchasing the at least one inventory item;
predicting a time at which the at least one inventory item will expire;
predicting a time at which the at least one inventory item will be consumed;
providing to the user an advertisement for an inventory item corresponding to or useable instead of the at least one inventory item;
providing to the user an indication that the at least one inventory item has expired; and
providing to the user a recommendation to discard the at least one inventory item.

In some embodiments of the second aspect, the first sensor and the second sensor are sensors of different types and the first input signal and the second input signal are signals of different types. In some such embodiments, the processing further includes processing the first and second input signals together with user-specific information learned over time using machine-learning techniques to identify the change.

In some embodiments of the first and second aspects, the second signal is selected from the group consisting of:
an image signal;
a pressure signal;
a time based signal;
a calendar based signal;
an optical signal;
a radio frequency signal;
a photospectrometry input signal;
a raman spectrometry input signal;
a material oscillation measurement signal;
a magnetic resonance measurement signal;
a kinetic wave decay signal;
an ultrasonic signal; and
a chemical signal.

In some embodiments of the first and second aspects, the user-specific information learned over time includes at least one of:
information relating to a consumption rate of the at least one inventory item;
information relating to a specific location in the storage area of the at least one inventory item;
information relating to a purchasing pattern of the at least one inventory item; and
information relating to a use pattern of the at least one inventory item.

In some such embodiments, the information relating to a consumption rate includes at least one of:
a time from purchase by which the at least one inventory item is consumed; and
a number of times the at least one inventory item is removed from the storage area until the at least one inventory item is consumed.

In some such embodiments, the information relating to a specific location includes a storage location in the storage area, assigned by a user of the storage area to the at least one inventory item.

In some such embodiments, the information relating to a purchasing pattern includes at least one of:
information relating to a frequency at which the at least one inventory item is to purchased;
information relating to a quantity of the at least one inventory item which is purchased when the at least one inventory item is purchased;
information relating to a quantity of the at least one inventory item available in the storage area when an additional quantity of the at least one inventory item is purchased;
information relating to a minimum threshold quantity of the at least one inventory item; and
information relating to a maximum threshold quantity of the at least one inventory item.

In some such embodiments, the information relating to a use pattern of the at least one inventory item includes at least one of:
information relating to a number of times the at least one inventory item is used before it is consumed;
information relating to a quantity of the at least one inventory item consumed in a pre-defined time unit;
information relating to a change in a use pattern of the at least one inventory item based on availability or consumption of at least one other inventory item;
information relating to at least one other inventory item which may be interchanged with the at least one inventory item;
information relating to at least one other inventory item consumed or used together with the at least one inventory item; and
information relating to a quantity of the at least one inventory item consumed in a single use of the at least one inventory item.

In some embodiments of the first and second aspects, the user is associated with at least one segment of users, wherein segment-specific information for the at least one segment of users is learned over time using machine-learning techniques, and wherein the processing is also based on segment-specific information learned over time. In some such embodiments, the segment specific information includes at least one of:
information relating to a consumption rate of the at least one inventory item;
information relating to a specific location in the storage area of the at least one inventory item;
information relating to a purchasing pattern of the at least one inventory item; and
information relating to a use pattern of the at least one inventory item.

In some embodiments of the first and second aspects, the processing is also based on item-specific information relating to characteristics of the at least one inventory item, item-specific information is learned over time using machine learning techniques. In some such embodiments, the item-specific information includes at least one of:
information relating to one or more dimensions of the at least one inventory item;
information relating to a footprint of the at least one inventory item;
information relating to a color of the at least one inventory item;
information relating to a barcode of the at least one inventory item;
information relating to an expected expiration date of the at least one inventory item;
information relating to a shape of the at least one inventory item; and
information relating to an initial weight of the at least one inventory item.

In some embodiments of the first and second aspects, processing the first and second signals further includes, prior to identifying the change, processing at least the first and second signals to uniquely identify the at least one inventory item in the storage area. In some embodiments, processing the first and second signals to uniquely identify the at least one inventory item further includes using data obtained from a data repository including information about inventory items to uniquely identify the at least one inventory item.

In some embodiments, using data obtained from a data repository includes using data obtained from a user-specific data repository including information about inventory items used by the user, and wherein the at least one action further includes updating the user-specific data repository with information relating to the at least one inventory item. In some embodiments, using data obtained from a data repository includes using data obtained from a segment-specific data repository including information about inventory items used by uses in a segment of users with which the user is associated. In some embodiments, using data obtained from a data repository includes using data obtained from an inventory-item data repository including information about characteristics of inventory items.

In some embodiments of the first and second aspects, the change in the at least one inventory item includes at least one of:
a reduction in the number of units of the at least one inventory item;
a reduction in the weight of the at least one inventory item;
a reduction in the volume of the at least one inventory item;
an increase in the number of units of the at least one inventory item;
an increase in the weight of the at least one inventory item;
an increase in the volume of the at least one inventory item;
removal of the at least one inventory item from the storage area;
insertion of the at least one inventory item into the storage area;
a change in the location of the at least one inventory item within the storage area; and
a change in the orientation of the at least one inventory item within the storage area.

In some embodiments of the first and second aspects, the storage area includes at least one of:
a portion of a pantry;
a portion of a refrigerator;
a portion of a freezer;
a portion of a cabinet; and
a container.

In some embodiments of the first and second aspects, receiving the first and second input signals occurs periodically. In some embodiments of the first and second aspects, receiving the first and second input signals occurs intermittently.

In some embodiments of the first and second aspects, receiving the first and second input signals is responsive to at least one triggering event. In some such embodiments, the at least one triggering event includes at least one of:
a change in an environment of the storage area;
movement of at least one inventory item within the storage area;
removal of at least one inventory item from the storage area;
insertion of at least one inventory item into the storage area;
opening or closing of the storage area;
a change in pressure distribution within the storage area; and
disruption of an electronic circuit associated with the storage area.

In some embodiments of the first and second aspects the method further includes, following receiving and prior to processing, pre-processing the first and second input signals to obtain the first and second signals.

In some embodiments of the first and second aspects, processing the first and second signals based on the first and second input signals includes processing the first and second input signals.

In accordance with the first aspect of the present invention, there is provided a system for managing inventory in a storage area of a user, the storage area housing at least one inventory item, the system including:
a plurality of sensors functionally associated with the storage area;
an input module adapted to receive at least a first input signal from a first sensor of the plurality of sensors and a second input signal from a second sensor of the plurality of sensors, the first sensor and the second sensor being sensors of different types and the first input signal and the second input signal being signals of different types;
a learning module adapted to learn user-specific information over time using machine learning techniques; and
a processor adapted to:
receive at least two signals from the input module, the at least two signals being based on the first and second input signals;
process the first and second signals together with the user-specific information to identify a change in at least one inventory item in the storage area; and
based on the identified change, carry out at least one action, the at least one action including at least one of:
adding the at least one inventory item to an inventory replenishment list;
removing the at least one inventory item from an inventory replenishment list;
updating a data repository to reflect the change to the at least one inventory item;
predicting a time at which the at least one inventory item will expire;
predicting a time at which the at least one inventory item will be consumed;
purchasing the at least one inventory item;
providing to the user an advertisement for an inventory item corresponding to or useable instead of the at least one inventory item;
providing to the user, via a user interface associated with the system, an indication that the at least one inventory item has expired; and
providing to the user, via the user interface associated with the system a recommendation to discard the at least one inventory item.

In some embodiments of the first aspect, at least the first signal is selected from the group consisting of:
a photospectrometry signal;
a raman spectrometry signal;
a material oscillation measurement signal;
a magnetic resonance measurement signal;
a kinetic wave decay signal;
an ultrasonic signal; and
a chemical signal.

In accordance with the first aspect of the present invention, there is provided a system for managing inventory in a storage area of a user, the storage area housing at least one inventory item, the system including:

a plurality of sensors functionally associated with the storage area;

an input module adapted to receive at least a first input signal from a first sensor of the plurality of sensors and a second input signal from a second sensor of the plurality of sensors;

a processor adapted to:
receive at least two signals from the input module, the at least two signals being based on the first and second input signals;
process the first and second signals to identify a change in at least one inventory item in the storage area; and
based on the identified change, carry out at least one action, the at least one action including at least one of:
adding the at least one inventory item to an inventory replenishment list;
removing the at least one inventory item from an inventory replenishment list;
updating a data repository to reflect the change to the at least one inventory item;
predicting a time at which the at least one inventory item will expire;
predicting a time at which the at least one inventory item will be consumed;
purchasing the at least one inventory item;
providing to the user an advertisement for an inventory item corresponding to or useable instead of the at least one inventory item;
providing to the user, via a user interface associated with the system, an indication that the at least one inventory item has expired; and
providing to the user, via the user interface associated with the system a recommendation to discard the at least one inventory item, wherein at least the first signal is selected from the group consisting of:
a photospectrometry signal;
a raman spectrometry signal;
a material oscillation measurement signal;
a magnetic resonance measurement signal;
a kinetic wave decay signal;
an ultrasonic signal; and
a chemical signal.

In some embodiments of the second aspect, the first sensor and the second sensor are of different types. In some embodiments of the second aspect, the system further includes a learning module functionally associated with the processor and adapted to learn user-specific information over time using machine learning techniques, wherein the processor is adapted to process the at least two signals together with the user-specific information to identify the change.

In some embodiments of the first and second aspects, the second signal is selected from the group consisting of:
an image signal;
a pressure signal;
a time based signal;
a calendar signal;
an optical signal;
a radio frequency signal;
a photospectrometry signal;
a raman spectrometry signal;
a material oscillation measurement signal;
a magnetic resonance measurement signal;
a kinetic wave decay signal;
an ultrasonic signal; and
a chemical signal.

In some embodiments of the first and second aspects, the plurality of sensors includes at least one of:
an image sensor;
a pressure sensor;
a time of flight camera;
a stills camera;
a video camera;
an optical-spectrometry sensor;
a radio-frequency absorption spectrometry sensor;
a Raman spectrometry system;
a sensor adapted to detect the decay of a kinetic wave pattern;
an ultrasonic sensor;
a magnetic resonance measuring device;
a USID reader;
an RFID reader;
a barcode reader;
a QR code reader;
a chemical sensing device;
a mass spectrometer;
a odor sensor;
an air sampling device; and
a vibration sensor.

In some embodiments of the first and second aspects, the input module includes a pre-processing module, adapted to receive the first and second input signals, to pre-process the first and second input signals, and to provide the pre-processed input signals to the processor as the at least two signals.

In some embodiments of the first and second aspects, the input module is adapted to provide the first input signal and the second input signal to the processor as the at least two signals.

In some embodiments of the first and second aspects, the system further includes at least one light projector adapted to project light in the storage area during operation of at least one of the plurality of sensors.

In some embodiments of the first and second aspects, the user-specific information learned over time includes at least one of:
information relating to a consumption rate of the at least one inventory item;
information relating to a specific location in the storage area of the at least one inventory item;
information relating to a purchasing pattern of the at least one inventory item; and
information relating to a use pattern of the at least one inventory item.

In some such embodiments, the information relating to a consumption rate includes at least one of:
a time from purchase by which the at least one inventory item is consumed; and
a number of times the at least one inventory item is removed from the storage area until the at least one inventory item is consumed.

In some such embodiments, the information relating to a specific location includes a storage location in the storage area, assigned by a user of the storage area to the at least one inventory item.

In some such embodiments, the information relating to a purchasing pattern includes at least one of:
information relating to a frequency at which the at least one inventory item is purchased;

information relating to a quantity of the at least one inventory item which is purchased when the at least one inventory item is purchased;

information relating to a quantity of the at least one inventory item available in the storage area when an additional quantity of the at least one inventory item is purchased;

information relating to a minimum threshold quantity of the at least one inventory item; and information relating to a maximum threshold quantity of the at least one inventory item.

In some such embodiments, the information relating to a use pattern of the at least one inventory item includes at least one of:

information relating to a number of times the at least one inventory item is used before it is consumed;

information relating to a quantity of the at least one inventory item consumed in a pre-defined time unit;

information relating to a change in a use pattern of the at least one inventory item based on availability or consumption of at least one other inventory item;

information relating to at least one other inventory item which may be interchanged with the at least one inventory item;

information relating to at least one other inventory item consumed or used together with the at least one inventory item; and information relating to a quantity of the at least one inventory item consumed in a single use of the at least one inventory item.

In some embodiments of the first and second aspects, the user is associated with at least one segment of users, the learning module is adapted to learn segment-specific information for the at least one segment of users over time using machine-learning techniques, and the processor is adapted to process the first and second signals also based on segment-specific information learned over time.

In some such embodiments, the segment specific information includes at least one of:

information relating to a consumption rate of the at least one inventory item;

information relating to a specific location in the storage area of the at least one inventory item;

information relating to a purchasing pattern of the at least one inventory item; and information relating to a use pattern of the at least one inventory item.

In some embodiments of the first and second aspects, the learning module is adapted to learn item-specific information, relating to characteristics of the at least one inventory item, over time using machine learning techniques, and the processor is further adapted to process the first and second signals also based on the item-specific information.

In some such embodiments, the item-specific information includes at least one of:

information relating to one or more dimensions of the at least one inventory item;

information relating to a footprint of the at least one inventory item;

information relating to a color of the at least one inventory item;

information relating to a barcode of the at least one inventory item;

information relating to an expected expiration date of the at least one inventory item;

information relating to a shape of the at least one inventory item; and information relating to an initial weight of the at least one inventory item.

In some embodiments of the first and second aspects, the processor is further adapted, prior to identifying the change, to process at least the first and second signals to uniquely identify the at least one inventory item in the storage area. In some such embodiments, the system further includes at least one data repository including information about inventory items, the data repository functionally associated with the processor, wherein the processor is adapted to use data obtained from the data repository to uniquely identify the at least one inventory item.

In some embodiments, the data repository includes a user-specific data repository including information about inventory items used by the user. In some embodiments, the data repository includes a segment-specific data repository including information about inventory items used by uses in a segment of users with which the user is associated. In some embodiments, the data repository includes an inventory-item data repository including information about characteristics of inventory items.

In some embodiments of the first and second aspects, the change in the at least one inventory item includes at least one of:

a reduction in the number of units of the at least one inventory item;

a reduction in the weight of the at least one inventory item;

a reduction in the volume of the at least one inventory item;

an increase in the number of units of the at least one inventory item;

an increase in the weight of the at least one inventory item;

an increase in the volume of the at least one inventory item;

removal of the at least one inventory item from the storage area;

insertion of the at least one inventory item into the storage area;

a change in the location of the at least one inventory item within the storage area; and a change in the orientation of the at least one inventory item within the storage area.

In some embodiments of the first and second aspects, the first and second sensors are adapted to provide the first and second input signals periodically. In some embodiments of the first and second aspects, the first and second sensors are adapted to provide the first and second input signals intermittently.

In some embodiments of the first and second aspects, the first and second sensors are adapted to provide the first and second input signals in response to at least one triggering event. In some such embodiments, the at least one triggering event includes at least one of:

a change in an environment of the storage area;

movement of at least one inventory item within the storage area;

removal of at least one inventory item from the storage area;

insertion of at least one inventory item into the storage area;

opening or closing of the storage area;

a change in pressure distribution within the storage area; and disruption of an electronic circuit associated with the storage area.

Unless otherwise defined, all technical and scientific terms used herein have the same meaning as commonly understood by one of ordinary skill in the art to which the invention pertains. In case of conflict, the specification, including definitions, will take precedence.

As used herein, the terms "including", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As used herein, the indefinite articles "a" and "an" mean "at least one" or "one or more" unless the context clearly dictates otherwise.

As used herein, when a numerical value is preceded by the term "about", the term "about" is intended to indicate +/−10%.

Embodiments of methods and/or devices of the invention may involve performing or completing selected tasks manually, automatically, or a combination thereof. Some embodiments of the invention are implemented with the use of components that include hardware, software, firmware or combinations thereof. In some embodiments, some components are general-purpose components such as general purpose computers or oscilloscopes. In some embodiments, some components are dedicated or custom components such as circuits, integrated circuits or software.

For example, in some embodiments, some of an embodiment is implemented as a plurality of software instructions executed by a data processor, for example which is part of a general-purpose or custom computer. In some embodiments, the data processor or computer includes volatile memory for storing instructions and/or data and/or a non-volatile storage, for example, a magnetic hard-disk and/or removable media, for storing instructions and/or data. In some embodiments, implementation includes a network connection. In some embodiments, implementation includes a user interface, generally including one or more of input devices (e.g., allowing input of commands and/or parameters) and output devices (e.g., allowing reporting parameters of operation and results.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures:

FIG. 2 is a flow chart of an embodiment of a method for managing inventory in a storage area according to an embodiment of the teachings herein.

DESCRIPTION OF SOME EMBODIMENTS OF THE INVENTION

Figure 1:
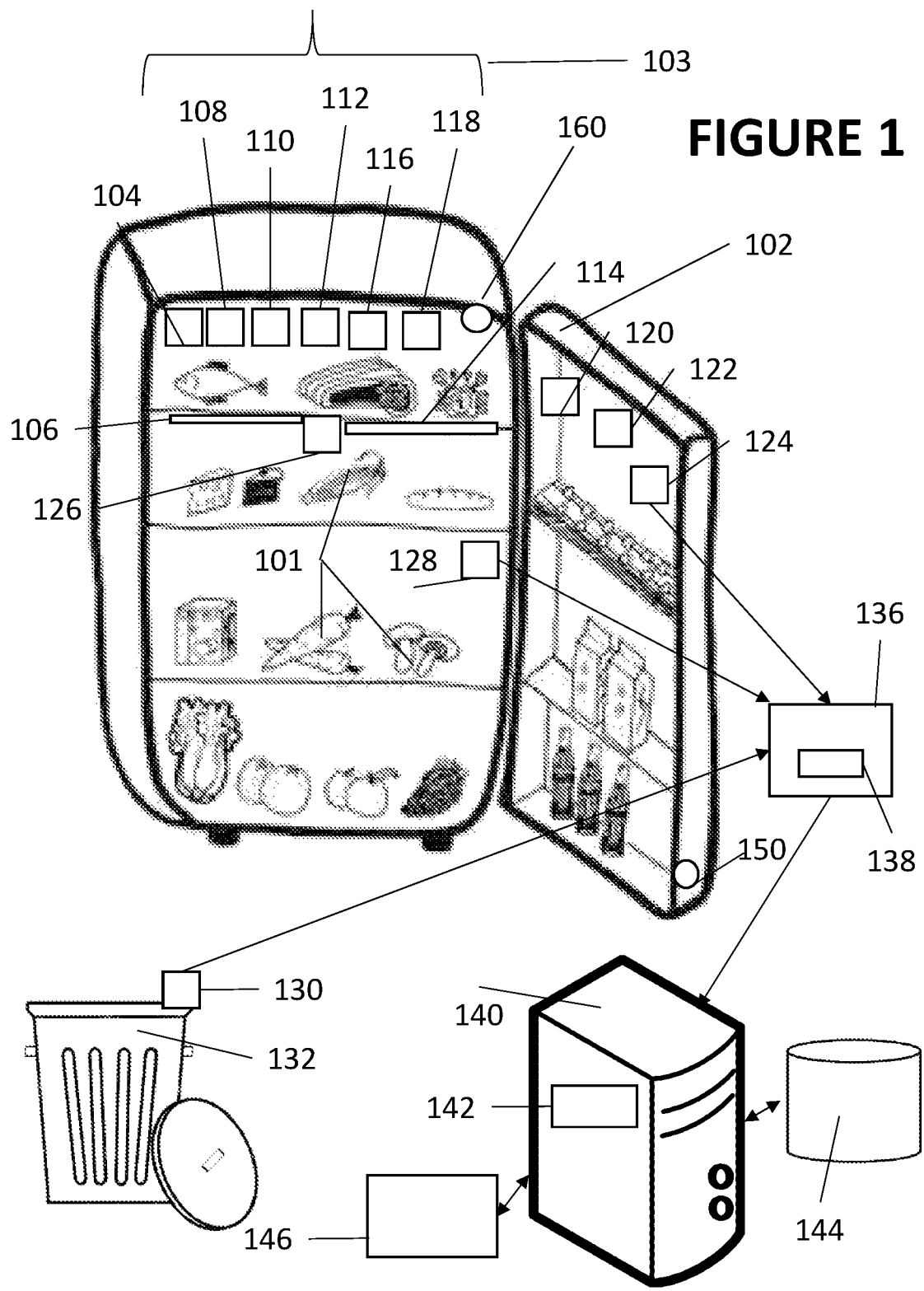
FIG. 1 is a schematic depiction of an embodiment of a system for managing inventory in a storage area according to an embodiment of the teachings herein.

The invention, in some embodiments, relates to the field of managing inventory, and more particularly to methods and systems for automatically tracking inventory and consumption rates of inventory items and carrying out one or more actions based on identified changes in inventory.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the Examples. The invention can be implemented with other embodiments and can be practiced or carried out in various ways. It is also understood that the phraseology and terminology employed herein is for descriptive purpose and should not be regarded as limiting.

In the context of the present application, the term "inventory item" relates to any object which a user stocks in a home, retail, or commercial setting, including purchasable products, retail products, wholesale products, warehouse products, and manufacturing products, and may relate to products of any type, including for example groceries, electronics, health care products, cosmetic products, books, toys, games, and paper products.

In the context of the present application the terms "feature" and "characteristic" may be used interchangeably, and, when applied to an inventory item, relate to any characteristic of the inventory item which provides information regarding the inventory item, and which may be used to uniquely identify the inventory item and/or to identify substitutes for the inventory item.

In the context of the present application, the term "segment of users" relates to a group of users sharing at least one common characteristic, such as, for example, the segment of "children", the segment of "vegetarians", the segment of "people above the age of 65", and the like. A segment may also be defined by the habits of the users, for example the segment of "all people who use at least three quarts of milk and at least a dozen eggs each week" or the segment of "all the users from California who tend to consume 2 gallons of orange juice, 3 packages of kale, and at least three cans of beans each week". A single user may be associated with multiple segments. For example, a vegetarian child would be associated with the segment of children, with a segment of vegetarians, and with a segment of vegetarian children. Machine learning algorithms may use the common characteristic(s) of users in the segment to learn information, or make predictions, about each user within the segment. The association of a user to a segment may be based on information explicitly provided by the user, or may be automatically learned over time, for example based on the correlation of user-specific information with segment-specific information.

In the context of the present application, the term "segment-specific information" relates to information which is common to at least a majority of users in a user segment, if not to all the users in a user segment. For example, the segment-specific information for vegan users may indicate that they never buy eggs or milk, and, at a high likelihood, buy beans and vegetables. Some segment-specific information may be inherent in the definition of the segment, for example, the users of the segment "all people who consume more than a gallon of milk per week" clearly consume a gallon of milk each week. Some segment-specific information may be learned automatically over time using machine learning techniques, while the association of a user to a segment may be based on information explicitly provided by the user, or may be learned over time.

In the context of the present application, the term "user-specific information" relates to information which is specific to the user or the user's habits, and which is learned automatically using machine learning techniques and is not explicitly provided by the user.

In the context of the present application, the term "effective inventory" relates to the usable amount of an item or product. In other words, the amount of the item or product which is available for use, and which is not expired, rotten, spoiled, or otherwise unusable. Frozen items which may be defrosted and then used are considered part of the effective inventory of the item.

In accordance with the disclosed invention, inputs are received from various sensors located in one or more storage areas, such as pantries and refrigerators. The received inputs are analyzed together with additional information, in order to detect and/or calculate the current inventory of one or more inventory items in the storage area(s). The additional data used when analyzing the received input may include a user profile, information relating to user habits, information relating to one or more characteristics of the inventory item, and the like, to identify at least some of the products in the storage area(s), and to estimate the effective inventory of the identified products in the storage area(s).

In some embodiments, input from at least two different types of sensors is used for identification of an inventory item and/or of its quantity or inventory. In some embodiments, input from at least two different types of sensor is required to make such an identification, because input from a single type of sensor is insufficient for accurate, or reasonably accurate, package identification and/or quantity estimation. The inventors have found that a combination of inputs from several types of sensors provides sufficient information to facilitate identification of the package and/or the quantity of the product therein with high probability.

For example, if a partial barcode has been captured by an image sensor, and the partial barcode can represent two different items, gathering additional information regarding the weight of the item, for example by one or more pressure sensitive sensor arrays, may provide additional information and enable accurate identification of the item, at least in high probability. If one of the two items which may be represented by the partial barcode is typically light, such as a bag of potato chips, and the other item which may be represented by the partial barcode is typically heavy, such as a gallon of juice, the additional pressure information, which is indicative of the weight of the item, would facilitate identification of the item with a high probability. Specifically, if the sensed weight is greater than the weight of the bag of potato chips, the system could identify with certainty that the item is the gallon of juice.

As another example, when a product has two package versions having similar color signatures but different package sizes, identification of the color signature of the package by visual sensors such as image sensors would be insufficient for accurate identification of the inventory item, and accurate identification could be facilitated by using additional input relating to the weight of the package.

The identification of inventory items and monitoring of their quantity may also take into account information not sensed by sensors in the system, such as information relating to the user's habits. For example, the system may know that a user stores cereals and cookies on the same shelf, and is used to eating cereal in the morning. In the morning hours, the sensors provide input indicating that a package has been removed from the shelf, but the input is insufficient for determining whether the removed item was a package of cereal or a package of cookies. The processor may then associate a high probability score with the cereal item, indicating that it is more likely that the removed product was cereal, due to the fact that it is morning and that the information relating to the user's habits indicates use of cereal in the morning.

In some cases, the identification of an inventory item, even using multiple different sensor inputs and/or sources of information, is not 100% certain, but rather is associated with a probability score indicating the probability that the identification is correct. In such cases, an action will be carried out only if the probability score is above an identification threshold, indicating that there is a high enough chance that the identification is correct. The identification threshold may be the same for all inventory items, or may be different for different inventory items. For example, if an inventory item is very expensive or is hard to store, it would be more important to ensure that the identification is correct before buying more of the item, whereas this would be less important for non-perishables that are regularly consumed by the user. The specific threshold used may be defined by the user, for example when setting up the system, may be learned over time, or may be a default value.

When an item is taken out of its typical storage location in the storage area, this event can serve as an indication of consumption, and the system can use predefined settings and/or automatically learned information relating to the user's habits to identify a duration from removal of the product which is indicative of complete consumption of the product.

The system may also use product-to-product associations, which can be predefined or may be automatically learned by the system, in order to identify inventory items. For example, if the system recognizes that an inventory item taken out by the user is either a jar of coffee or a package of chewing gum, and immediately thereafter detects removal from the storage area of paper cups, the system may conclude, based on information relating to the user's habits, to the habits of a segment of users, or to the habits of all users, that the user probably took the coffee and not the chewing gum.

In some embodiments, the system may predict when an inventory item will be consumed, based on information relating to the user's habits. For example, if the sensor input indicates that there are three apples in the refrigerator, and the information relating to the user's habits indicates that the user eats two apples a day, the system will be able to predict that the apples would be consumed by the next day, and additional apples should be purchased.

In some embodiments, the system may learn the features of a specific item and characteristic patterns of sensed input relating to the item by drawing conclusions regarding unknown or uncertain characteristics based on reliable input. For example, the system may automatically learn the weight of a product that has been identified with high probability by visual input, or the system may automatically learn to identify the package of a certain product that has been positively identified by its barcode.

When an inventory item has been identified and its effective quantity assessed, and/or when there is a change to an inventory item, the system may automatically carry out an action associated with the inventory item or with the identified change. For example, when complete consumption of an inventory item is identified, the system may automatically add the inventory item to a grocery list of the user, present to the user a notification that the item has been consumed and should be purchased, or automatically purchase the inventory item using an online shopping system.

Additionally, following identification of a change to an inventory item, the system may update one or more data repositories to reflect the identified change or statistics related thereto. For example, once the system identified a certain occasion in which a gallon of orange juice was consumed in two days, the system updates the average consumption rate for orange juice.

Reference is now made to FIG. 1, which is a schematic depiction of an embodiment of a system 100 for managing inventory in a storage area 102 according to an embodiment of the teachings herein. The storage area includes at least one inventory item 101, illustrated in FIG. 1 as a plurality of inventory items.

As seen in FIG. 1, the system 100 is functionally associated with a storage area 102, here shown as a refrigerator. However, the system may be associated with any suitable storage area, such as a portion of a refrigerator, a portion of a freezer, a portion of a pantry, a cabinet, a container, a portion of a room, or any other storage area used for storing inventory items.

System 100 further includes a plurality of sensors 103, which are adapted to sense various characteristics of the storage area. The plurality of sensors 103 may include multiple sensors of a single type, or sensors of different types, as described herein. As explained in further detail hereinbelow, signals provided by the plurality of sensors 103 are used to identify inventory items in the storage area and/or gauge an effective quantity of inventory items in the storage area.

In some embodiments, the plurality of sensors 103 includes one or more cameras or other image capturing sensors 104. Each such camera may be a video camera, a stills camera, or any other suitable type of camera. Each camera 104 is adapted to capture images of the storage area and of inventory items therein. Each camera 104 may be placed inside, above, below, or on a side of the storage area and may be used for collecting visual information related to inventory items in or near the storage area. In some embodiments, the plurality of sensors 103 includes multiple cameras 104 allowing images to be captured from multiple points of view, thereby providing additional information about the storage area and its contents.

In some embodiments, one or more cameras 104 may be Time of Flight (ToF) cameras, which may be used for collecting information regarding the three dimensional features of objects and inventory items in the storage area.

Each of cameras 104 may be stationary or may be mobile relative to the storage area. Mobile cameras 104 may automatically change location as needed, under the operation of a camera controller (not shown), so as to get a better of view of the storage area or of one or more specific inventory items therein.

In some embodiments, the plurality of sensors 103 includes one or more pressure sensors 106, adapted to sense a pressure of one or more inventory items in the storage area. In some embodiments, the pressure sensor(s) 106 is provided in the base of the storage area, such as on a refrigerator or cabinet shelf, and senses the pressure applied to the base of the storage area by one or more inventory items. As explained in further detail hereinbelow, pressure signals provided by pressure sensor(s) 106 may be used to gauge the weight or mass of one or more inventory items in the storage area, and/or to provide input relating to the shape and/or footprint of an inventory item.

In some embodiments, the plurality of sensors 103 includes at least one optical-spectrometry sensors 108, adapted to collect spectroscopic data, which provides fast and efficient analysis of food items, using a remote sampling capability to determine the components of the food items. In some embodiments, the optical-spectrometry sensor is an infrared spectrometry sensor adapted to collect spectroscopic data on the infra-red spectrum, which data can serve as an indication of the temperature of a sensed object. For example, infra-red spectroscopic data of an inventory item in the storage area may indicate the temperature of the inventory item.

In some embodiments, the plurality of sensors 103 includes a radio-frequency absorption-spectrometry sensor 110, adapted to collect spectroscopic data.

Spectroscopic signals provided by sensors 108 and/or 110 may be used to extract information regarding characteristics of an inventory item in the storage area, and/or regarding the content of an inventory item in the storage area.

In some embodiments, the plurality of sensors 103 includes a Raman spectrometry system 112 adapted to collect data regarding the chemical composition of an object or inventory item, which may be used to validate the identification of an item, and/or to validate that the item is still usable.

In some embodiments, the plurality of sensors 103 includes a sensor 114 that detects the decay of a kinetic wave pattern caused by an object when being placed on a surface. In some embodiments, the surface may be a base surface in the storage area on which inventory items may be placed, such as the surface of a shelf.

In some embodiments, the plurality of sensors 103 includes an ultrasonic volumetric sensor 116, whose signals may provide information relating to the three-dimensional characteristics of a sensed object. Signals provided by sensor 116 may be used to extract information relating to the three dimensional shape and/or characteristics of inventory items in the storage area and/or to a content level of such inventory items. Sensor 116 is functionally associated with an ultrasound generator (not shown), which forms part of the system 100 in embodiments which include sensor 116.

In some embodiments, the plurality of sensors 103 includes a magnetic resonance measuring device 118 adapted to collect magnetic resonance information from the storage area, which information may be used to extract information relating to the content of an inventory item in the storage area.

In some embodiments, the plurality of sensors 103 includes an Ultra Sound Identification (USID) reader 120 and/or a Radio-Frequency Identification (RFID) reader 122. Such sensors are suitable for reading corresponding tags attached to inventory items in the storage area, so as to provide an identification of the inventory items.

In some embodiments, the plurality of sensors 103 includes one or more chemical sensing devices 124, adapted to collect information about the environment in or near the storage area. For example, a chemical sensing device 124 may include a mass spectrometry apparatus adapted to provide information relating to the chemical structure of the inventory item. In some embodiments, the chemical sensing device may include an odor sensor, such as an "electronic nose" device, adapted to provide information about odors in the storage area, which may assist in identifying inventory items in the storage area, or indicate spillage of inventory items in the storage area.

In some such embodiments, the system 100 may include a mechanism (not shown) for drawing air towards the chemical sensing device 124, such as a fume hood or any other type of air sampling apparatus, so as to enable device 124 to detect and sample air in or near the storage area.

In some embodiments, the plurality of sensors 103 may include a system 126 for inducing vibrations or oscillations in an object and for sensing such vibrations. For example, such a system may include a sound or infrasound generator that can induce oscillations in an object, and a laser beam projector functionally associated with a dynamic pressure sensor adapted to detect the oscillation patterns. Detection of the oscillation patterns enables the system to detect the viscosity of the material, which can assist in identification of the material and in estimation of a quantity in a container.

In some embodiments, the plurality of sensors 103 may include a time sensor 128, such as a clock and/or calendar.

In some embodiments, system 100 may include additional sensors 130, which are not disposed in or near the storage area. For example, a camera may be disposed in or near a waste-basket or garbage can 132, and may monitor items discarded into the garbage can 132.

Sensors 130 may provide information relating to discarded inventory items, thereby providing information regarding the effective inventory of those items.

Signals obtained from the plurality of sensors 103, including any one or more of sensors 104, 106, 108, 110, 112, 114, 116, 118, 120, 122, 124, 126, and 130, are provided to an input module 136, which is functionally associated with a processor 140. The input unit may form part of the device housing processor 140, such as part of a computer or server, or may be a dedicated input unit communicating with processor 140 via a communication network In some embodiments, the input unit 136 may include a pre-processing module 138 which is adapted to receive input signals from the plurality of sensors 103, and to pre-process the received input signals to generate processed signals, which processed signals are transmitted to the processor 140 for further processing thereof. In other embodiments, the input unit 136 receives the input signals from the plurality of sensors 103, and transmits the received input signals to the processor 140 without any pre-processing.

Processor 140 is adapted to uniquely identify inventory items in storage area 102, gauge an inventory level of such inventory items and/or identify a change in such inventory items, and initiate one or more actions in response to identification of such a change, as explained in detail hereinbelow.

Processor 140 may form part of a dedicated device custom-made to implement the teachings herein, or may be a processor of any suitable computing device, such as, for example, a stationary, mobile, or wearable computing device (server, cell phone, PDA, smartphone, mobile computer, tablet computer, desktop computer, augmented reality glasses, smart watch). In some embodiments, the processor 140 is local to the storage area 102, as illustrated in FIG. 1. In other embodiments, the processor 140 is remote from the storage area 102, and communicates with additional components of the system 100 via a wired or wireless communication network.

In some embodiments, processor 140 comprises a learning module 142, functionally associated with one or more data repositories 144, such as a user information database, an inventory item database, a user-segment database, and the like. The learning module 142 is adapted to use machine-learning techniques to learn user-specific information, segment-specific information, and/or item-specific information, over time, as explained in further detail hereinbelow. In some embodiments, information learned by the learning module 142 is used by processor 140, together with the received sensor signals or pre-processed sensor signals, to identify inventory items in storage area 102 and/or to identify changes to such inventory items, as explained in further detail hereinbelow.

In some embodiments, processor 140 may be associated with a user interface 146. User interface 146 may be used for receiving input from the user, such as information relating to a user profile, and for providing information to a user, for example via a display of the user interface. User interface 146 may be any suitable user interface, such as a user interface including a display screen, a keyboard, and a mouse or other pointing utility. In some embodiments, the user interface 146 is a dedicated device, as described in Applicant's co-pending U.S. patent application Ser. No. 14/895,375 which is incorporated herein by reference as if fully set forth herein.

In some embodiments, system 100 may further include a triggering module 150, functionally associated with one or more of the plurality of sensors 103, with the input module 136, and/or with the processor 140. The triggering module 150 is adapted to automatically activate some or all of the plurality of sensors 103, the input module, and/or the processor in response to a triggering event. In some embodiments, some of the sensors in the plurality of sensors 103 may also form part of the triggering module 150. Such sensors may be operative constantly, periodically, or intermittently, in order to sense a triggering event, and once a triggering event is sensed, may provide input signals to the input module as explained hereinbelow.

For example, if the storage area is the freezer, the triggering module may include an electronic circuit which detects when the freezer is opened. When the freezer is opened (the triggering event occurs), it is assumed that a change is made to an item within the freezer, and as such the sensors are activated to collect information from the freezer and the processor is activated to identify the change.

In other embodiments, the plurality of sensors 103 provide signals to the input module 136 without any triggering thereof. For example, the sensors may provide signals to the input module 136 periodically at an input rate, or intermittently. Different sensors may have different input rates, for example according to the complexity of the obtained signal.

In some embodiments, system 100 further includes at least one illumination device 160, such as a light bulb, which may illuminate the storage area 102 during collection of information by the plurality of sensors 103. In some such embodiments, triggering module 150 also triggers operation of the illumination device 160.

Reference is now additionally made to FIG. 2, which is a flow chart of an embodiment of a method for managing inventory in a storage area according to an embodiment of the teachings herein, for example using system 100 of FIG. 1.

For use, at step 202 the input module 136 of system 100 receives input signals from at least two sensors of the plurality of sensors 103, and in some embodiments from all the sensors in the plurality of sensors 103. In some embodiments, the input signals include a first input signal received from a first sensor of the plurality of sensors, and a second input signal received from a second sensor of the plurality of sensors, where the first and second sensors are of different types.

The signals received by the input module 136 include at least two input signals, each of which may be any one of:

an image signal;
a pressure signal;
a time based signal;
a calendar based signal;
an optical signal;
a radio frequency signal;
a photospectrometry input signal;
a raman spectrometry input signal;
a material oscillation measurement signal;
a magnetic resonance measurement signal;
a kinetic wave decay signal;
an ultrasonic signal; and
a chemical signal.

In some embodiments, at least one of the received input signals is one of:
a photospectrometry input signal;
a raman spectrometry input signal;
a material oscillation measurement signal;
a magnetic resonance measurement signal;
a kinetic wave decay signal;
an ultrasonic signal; and
a chemical signal.

In some embodiments, the plurality of sensors 103 provide the signals to the input module 136 periodically, at a sensing rate. For example, the sensors 103 may provide signals once every minute, once every half-hour, or once every hour. In some embodiments, the sensing rate may be specific for each sensor in the plurality of sensors, and need not be the same for all the sensors.

In some embodiments, the plurality of sensors 103 provide the signals to the input module 103 intermittently.

In some embodiments, the operation of the system 100 and/or of the plurality of sensors 103 is triggered at step 200, prior to step 202, and the system and sensors thereof are in a sleeping mode until such triggering. For example, triggering of the system may be carried out in response to at least one triggering event, which is generated by, or is sensed by, triggering module 150.

In some embodiments, the triggering event may include a change in an environment of storage area 102, which is sensed by one or more suitable sensors included in the triggering module, such as a temperature sensor or a chemical sensor. For example, a change in the temperature in the refrigerator or freezer (storage area) may indicate that the door of the refrigerator or freezer has been opened, triggering the system 100 to begin operation to determine whether there has been a change to an inventory item in the storage area. As another example, a change in the odor felt by a chemical sensor in the storage area, may trigger the system 100 into operation to determine whether a change has occurred, such as for example addition of a new spice having a strong odor to the storage area, spillage of an item in the storage area (in which case the inventory of the item must be updated), or rotting of an item in the storage area (in which case the rotten item should be discarded and its effective inventory should be updated). As yet further examples, an illumination sensor may sense a change in the illumination in the storage area, which may be indicative of a change in the contents of the storage area, or of opening or closing of the storage area. Similarly, a sound sensor may sense a change in the storage area based on the sounds audible within the storage area, such as, for example, sounds within the storage area being louder when the door to the storage area is open, or footsteps approaching the storage area being indicative of a user approaching the storage area.

In some embodiments, the triggering event may include motion in or near the storage area 102, which is sensed by a suitable sensor included in triggering module 150 and mounted in or near the storage location and/or in or near the garbage can 132. For example, a motion sensor may trigger operation of the system 100 following opening and/or closing of the storage location, or movement of an inventory item within the storage area 102. Such triggering may enable the system and/or sensors to operate only when at least one inventory item is expected to be in motion, and therefore a change to the at least one item can be expected. As another example, a USID tag or an RFID tag reader may read RFID tags mounted onto inventory items in the storage area 102, to detect a change in location, or motion, of the inventory item. Motion of inventory items within the storage area may also be detected by one or more cameras or other image capturing devices forming part of the triggering module 150.

In some embodiments, the triggering event may include insertion of an inventory item into the storage area 102 or removal of an inventory item from the storage area 102. In some such embodiments, the triggering module may include USID and/or RFID tag readers, adapted to read USID and/or RFID tags attached to or embedded into the inventory items, which may be read by the tag reader(s) of the triggering module upon insertion into and/or removal from the storage area 102, or upon any other change to the inventory item bearing the tag. A change in the inventory items included within the storage area may also be detected by one or more cameras or other image capturing devices forming part of the triggering module 150.

In some embodiments, the triggering event may include a change of the pressure distribution within the storage area 102. Such a triggering event may be sensed by a pressure sensor or by a pressure sensitive array disposed in a horizontal surface of the storage area, such as on a shelf thereof, and may be indicative of a change in the location of an inventory item in the storage area, addition of an item to the storage area, and/or removal of an item from the storage area.

In some embodiments, the triggering event may include an indication of opening or closing of the storage area 102. In some such embodiments, the triggering module 150 may include an electronic circuit, which is disrupted upon opening or closing of the storage area, thereby to indicate that a change is likely to occur or has likely occurred in the storage area. Opening or closing of the storage area may also be sensed by a motion sensor associated with a door of the storage area, by a camera obtaining images of the door of the storage area, and the like. Opening and closing of the storage area 102 may also be detected by one or more cameras or other image capturing devices forming part of the triggering module 150, and/or by sensors sensing changes in the environment of the storage area, as explained hereinabove.

In some embodiments, input signals are provided by the plurality of sensors 103 to the input module 136 at intermittent times, determined in accordance with a behavior profile of the user, which behavior profile may be actively set by the user via user interface 146 or may be automatically learned by learning module 142. For example, if a user tends to take food items out of their refrigerator in time for breakfast, lunch, and dinner, but not in between these times, some or all components of system 100 may be in sleep mode during times other than the times at which the user typically has or prepares his meals.

In some embodiments, following receipt of the input signals by the input module 136, at step 204 the received input signals may be pre-processed by pre-processing module 138 to generate signals based on the received input signals. At step 206, the generated signals are provided by the input module 136 to processor 140 for further processing thereof.

In other embodiments, the pre-processing is omitted, and the input signals received by input module 136 are provided to processor 140 without any processing thereof.

In some embodiments, the processor 140 also obtains additional information to be used when processing the received signals at step 208. In some embodiments, the processor may access a database (not shown) including information relating to characteristics of inventory items. In some embodiments, the processor may obtain additional information from the learning module 142 or from a data repository 144 associated therewith.

In some embodiments, the additional information obtained from the learning module 142 includes user-specific information, such as information relating to habits of the user, which is learned over time using machine learning techniques, as explained in further detail hereinbelow. In some embodiments, the user is associated with one or more user-segments, and the additional information obtained from the learning module 142 includes segment-specific information for the segments with which the user is associated.

As explained in further detail hereinbelow, in some embodiments, the user-specific information may be information relating to a consumption rate of at least one inventory item, information relating to a specific location in the storage area of at least one inventory item, information relating to a purchasing pattern of at least one inventory item, and information relating to a use pattern of said at least one inventory item.

At step 210, the processor 140 processes the signals received thereby, in some embodiments together with additional information obtained at step 208, to identify a change to at least one inventory item in the storage area. For this purpose, the processor 140 must identify the inventory items in the storage area as well as a quantity thereof, in order to detect whether there has been a change to any of the inventory items.

At step 212, processor 140 evaluates whether or not a change to at least one inventory item has been identified. If no change has been identified, the system 100 awaits receipt of the next set of sensor inputs, and the method proceeds from step 202 as explained herein. However, if a change has been identified, at step 214 processor 140 carries out an action corresponding to, or based on, the identified change.

In some embodiments, following processing of the signals at step 210 and/or following carrying out of the action, at step 216 one or more data repositories 144 and/or learning module 142 may be updated, or "taught" using information obtained from the input signals and processing thereof.

In some embodiments, a change to at least one inventory item, which is identified at step 212, includes one or more of:
 a reduction in the number of units of the inventory item;
 a reduction in the weight of the inventory item;
 a reduction in the volume of the inventory item;
 an increase in the number of units of the inventory item;
 an increase in the weight of the inventory item;
 an increase in the volume of the inventory item;
 removal of the inventory item from the storage area;
 insertion of the inventory item into the storage area;
 a change in the location of the inventory item within the storage area; and
 a change in the orientation of the inventory item within the storage area.

In some embodiments, the action carried out at step 214 includes one or more of:
 adding the inventory item to an inventory replenishment list;
 removing the inventory item from an inventory replenishment list;
 updating a data repository to reflect said change to the inventory item;
 purchasing the inventory item;
 predicting a time at which the inventory item will expire;
 predicting a time at which the inventory item will be consumed;
 providing to the user an advertisement for an inventory item corresponding to or useable instead of the at least one inventory item;
 providing to the user an indication that the inventory item has expired; and
 providing to the user a recommendation to discard or to add the inventory item.

In some embodiments, the method includes an initial set-up phase in which the user creates a user profile, for example using an input component of user interface 146. The user profile may include demographic information such as the user's address, age, and the like, and may include information relating to the inventory kept by the user and to operation of the system, such as a typical expected inventory for one or more inventory items (e.g. always have milk in the refrigerator), rules for replenishment of inventory items (e.g. purchase new cookies only when the old cookies are finished, never automatically purchase candy but rather notify user of candy running out), a list of all possible inventory items which are acceptable to the user, preferred websites or stores for purchasing inventory items, defining that all ingredients need to be Gluten free, and the like.

The following description provides a detailed explanation relating to the processing of the input signals, identification of a change to an inventory item, and carrying out of an action, and includes many examples to clarify the logic used in the present invention.

Processing of the received input signals by pre-processing module 138 and/or by processor 140 may use various processing methodologies, as described herein.

In some embodiments, visual input received from camera or cameras 104 may be processed to extract information relating to three dimensional characteristics of an inventory item, a color signature of the inventory item, a pattern of or on the inventory item, text on the inventory item, and/or any other type of visual characteristic of the inventory item. Such information may be used to identify the inventory item, as well as to identify a quantity or inventory thereof, for example by counting the number of items of a specific type, or by identifying a degree to which a package of an item is full, for example in a transparent or partially transparent package.

Visual input provided to the input module may also include, in addition to graphic input which may be received from one or more cameras, barcodes, QR codes, and/or watermarks, all of which may be processed using techniques known in the art to identify the inventory item.

In some embodiments, varying wavelengths of light may be projected on or in the storage area 102, for example by illumination device 160. Such projection allows for visual input to have different reflection properties, such as color, shadow, and dispersion of inventory items, which may be measured by the processor 140 or by pre-processing module 138 and may assist in identification of the inventory item(s).

In some embodiments, the light projected by illumination device 160 onto or into the storage area 102 may be structured light, and processing of the captured input may use the received deformation, caused by use of the structured light, to calculate the three dimensional structure of inventory items which were thus illuminated.

In some embodiments, processor 140 and/or pre-processing module 138 use Shape From Shading algorithms to derive the three dimensional features of one or more inventory items from two dimensional image(s) of the inventory item(s).

In some embodiments, processor 140 and/or pre-processing module 138 use Stereo vision algorithms applied to input from separate cameras 104 to derive the three-dimensional features of inventory items in the captured visual input.

In some embodiments, processor 140 and/or pre-processing module 138 use Time of Flight (ToF) algorithms to derive the three dimensional characteristics of inventory items in the captured visual input.

In some embodiments, the visual input may be processed using OCR techniques to identify text printed on the inventory items. In some embodiments, the OCR techniques may include extracting primitives of the characters and analyzing the extracted primitives using machine learning algorithms.

In some embodiments, processor 140 and/or pre-processing module 138 use color local gradient algorithms to derive the color scheme characterizing the inventory items in the captured visual input.

In some embodiments, processor 140 and/or pre-processing module 138 may use passive or active infrared input, received for example from spectrometry sensors 108, to detect a temperature of an inventory item in the storage area. By evaluating the temperature spread across an inventory item, the system can gather data regarding the characterization of the inventory item and its content level. For example, the portion of a milk jug containing milk is typically cooler than the portion of the milk jug not containing milk. As such, evaluation of the temperature of a milk jug would enable the system to determine or estimate the portion of the milk jug filled with milk, thereby to evaluate the quantity of milk remaining in the jug.

In some embodiments, the temperature of inventory items may be continuously or periodically detected in order to measure a temperature change rate for the inventory item. Since different inventory items have different temperature change rates, processor 140 and/or pre-processing module 138 may use this information for characterizing or identifying the inventory items in the storage area 102.

In some embodiments, processor 140 and/or pre-processing module 138 may use radio frequency (RF) inputs received from the RF-absorption-spectrometry sensor 110 to analyze and/or identify the components of an inventory item or package. In some such embodiments, processor 140 and/or pre-processing module 138 may use the RF inputs to retrieve information regarding the content of a package, based on the components thereof.

In some embodiments, processor 140 and/or pre-processing module 138 may detect or identify the chemical content inside an inventory item or inside a storage location using chemical sensing devices 124 and/or Raman spectrometry system 112.

In some embodiments, inputs provided by the oscillation- or vibration-measuring sensor 126 are compared with stored oscillation characteristics, thereby to facilitate identification of the inventory item. For example, the oscillation of a viscous liquid, such as honey, after it has been moved, it different from the oscillation of a less viscous liquid, such as milk. Additionally, in some embodiments, such oscillation processing may be used for measurement of the amount of content within a package, for example by identifying the height within the package at which the content oscillates, or identifying the difference between an oscillation pattern of the full portion of the package and an oscillation pattern of the empty portion of the package.

In some embodiments, processing of the received input signals includes using and analyzing the magnetic resonance characteristics of an object, as measured by magnetic resonance measuring device 118.

In some embodiments, input signals received from one or more pressure sensors (or pressure sensitive arrays) 106 may be processed to extract information relating to the weight of an inventory item and/or information relating to the shape or footprint of the inventory item. Sensing the footprint of the inventory item by measuring the pressure points can provide vital information regarding the shape of the inventory item.

In some embodiments, processing of pressure input provided by pressure sensors 106 includes identifying micro-changes in the distribution of pressure over time, which changes may be is correlated with motion of the contents inside a package of an inventory item. The motion pattern can then serve as an indication quantity of the item present within the package. For example, taking into account the fact that it takes more time for liquid to return to a static state than for a solid or a powder, measuring the time and oscillation pattern of a package, such as a container of juice, as reflected by pressure changes, may provide important data indicating the quantity of juice within the container. As another example, such a measurement of a time and oscillation pattern may provide information as to whether the content of an unidentified package is liquid or solid.

In some embodiments, information regarding the kinetic wave decay pattern of an inventory item when it is placed on the surface, is received from the dynamic pressure sensor 114, and processor 140 and/or pre-processing module 138 may analyze the kinetic wave decay pattern of the object. Since different materials and different objects have different wave decay patterns, such analysis can contribute to identification of the inventory item and/or of the contents of a package thereof.

In some embodiments, ultrasonic volumetric sensor 116 provides signals, which may be used using ultrasonic volumetric imaging techniques known in the art for determining the dimensions of inventory items in the storage area.

In some embodiments, USID reader 120 and/or RFID reader 122 may interact with USID or RFID tags, respectively, which tags may be attached to or embedded in inventory items. As such, the readers 120 and/or 122 may be used to identify the items, their location within the storage area 102, and any characteristics thereof which may be read from the associated tags.

In some embodiments, processing of the input signals includes interpreting chemical input. In some embodiments, such interpreting includes analyzing the air content in the storage area, as received from a mass spectrometry device or from odor sensors or other chemical sensing devices 124. Analyzing air samples from of the storage area can provide information regarding the content of the storage area, such as information relating to quantity and ratio of materials therein. For example, the presence of a high level of lactose in the air of the storage area, may be indicative of the presence of one or more dairy products in the storage location.

The information retrieved from the processed signals may be combined to identify a specific inventory item, and its quantity, and thereby to identify a change to the item or to its quantity.

In some embodiments, in which identification of an inventory item is not certain, the information may be combined to associate a probability score with a potential candidate item. That is, the accuracy of identification of a product and/or a quantity thereof is assigned a probability score or weight, where the probability score or weight based at least partially on the results of processing of all input provided by the plurality of sensors 103.

In some such embodiments, carrying out of an action by the system may be dependent on the probability score assigned to the identification, such that the action will be carried out only if the certainty of identification is above a pre-defined threshold. The threshold may be provided by the user, for example via user interface 146, may be learned by learning module 142, or may be a default threshold value. The pre-defined threshold may be the same for all inventory items, or may be specific to an inventory item or category of inventory items. For example, due to the high cost of saffron, one may not want to purchase additional saffron unless they are 100%, or close to 100%, sure that additional saffron is required. Similarly, for items which take up a large amount of space, such as firewood, one may not want to purchase more of the item unless it is required at a high certainty, so as not to have storage problems.

As mentioned above, learning module 142 is adapted to learn user-specific information over time, using machine-learning techniques.

In some embodiments, the user-specific information includes information relating to a consumption rate of an inventory item, such as a time from the purchase of an inventory item by which the item is consumed, and a number of times the inventory item is removed from the storage area until it is consumed.

For example, the learning module 142 may learn that in Julia's house, a gallon of milk is consumed in one week from purchasing. This information may be used by the processor 140, together with sensor input information indicating the date at which a gallon of milk was placed in the refrigerator (such as for example image information), to predict when Julia will need to purchase another gallon of milk, to update Julia's shopping list accordingly, or to order a new gallon of milk, for the predicted date, from Julia's favorite online groceries vendor.

As another example, the learning module 142 may learn that Charles typically takes a loaf of bread out of the freezer six times before the loaf is consumed. This information, together with an identification of the time a loaf of bread was purchased and a counter of times that the loaf of bread was removed from the storage area, may be used by processor 140 to predict when an additional loaf of bread will be required.

As yet another example, the learning module 142 may learn that James eats two apples each day. An image signal indicating that James has four apples left in his fruit bowl enables processor 140 to predict when James will need to purchase additional apples.

In some embodiments, the user-specific information is information relating to a specific location assigned by the user of the storage area 102 to an inventory item. For example, the learning module 142 may learn that Michelle always keeps her orange juice in the right-most space in her refrigerator door. Pressure signals received from the location of the orange juice bottle indicate that there is something heavy in that location, and image signals indicate that there is a box in that location, but the processor 140 cannot use the sensor signals to identify the item in the right-most space of the refrigerator door. The additional information learned by the learning module enables the processor 140 to identify the heavy item in the door as a new, full, orange juice bottle, and to remove 'orange juice' from Michelle's groceries list.

In some embodiments, the user-specific information relates to a purchasing pattern of an inventory item.

In some embodiments, the information may relate to a frequency at which the inventory item is purchased. For example, the system may learn that a user purchases milk three times a week, and use this information to determine whether or not additional milk should be purchased.

In some embodiments, the information may relate to a quantity of the inventory item which is purchased when it is purchased. For example, the system may learn that when the user purchases bread, he always purchases three loaves at a time. This information may be used when determining how to update the user's groceries list.

In some embodiments, the information may relate to a quantity of the inventory item available in the storage area when an additional quantity of the item is purchased. For example, the system may learn that the user always purchases eggs when there are fewer than three eggs in the refrigerator. As such, when the system identifies using the sensor inputs that there are fewer than three eggs, it may automatically purchase additional eggs. Additionally, the system may decide to purchase eggs when there are four eggs remaining, since based on data in the system's data repositories it takes two days for eggs to be delivered from the time that they are ordered, and on average four eggs are consumed in two days.

In some embodiments, the information may relate to a minimum threshold quantity of the inventory item. For example, the system may learn that the number of apples in the user's fruit bowl never drops below five apples. As such, when input provided by the plurality of sensors indicates that the number of apples in the fruit bowl is getting close to five, such as six or seven apples, the system may purchase additional apples or recommend to the user to purchase additional apples. This information may be combined with information relating to the consumption habits of the user, as described above, to provide a more accurate estimate of when the threshold will be reached.

In some embodiments, the information may relate to a maximum threshold quantity of the inventory item. For example, the system may learn that the number of apples in the user's fruit bowl is never greater than ten apples, or that if the number of apples is greater than 10, some of them are thrown out and not used (as can be determined, for example, by input from sensor 132 near the garbage can). As such, when input provided by the plurality of sensors indicates that the number of apples in the fruit bowl is close to ten, such as eight or nine apples, the system may determine the user that no additional apples are required, and may notify the user not to buy apples in their weekly grocery shopping.

In some embodiments, the user-specific information relates to a use pattern of an inventory item.

In some such embodiments, the information relates to a number of times the inventory item is used before it is consumed, as explained hereinabove.

In some embodiments, the information relates to a quantity of the inventory item consumed in a pre-defined time unit, or in each use of the inventory item. For example, the system may learn that the Smith family finishes a quarter of a box of cornflakes each morning. This information, together with information relating to the quantity of cornflakes currently available in the Smith's pantry, may be used to predict when the cornflakes supply will need to be replenished.

In some embodiments, the information relates to a change in a use pattern of the inventory item based on availability or consumption of another inventory item. For example, the system may learn that the Mike typically eats one box of Oreos each week, but only eats half a box of Oreos in weeks that he also buys Chips Ahoy cookies. As such, if the sensor input received by the processor indicates that Mike has a box of Chips Ahoy cookies, and half a box of Oreos, it would determine that Mike does not need to buy additional cookies.

In some embodiments, the information relates to at least one other inventory item which may be interchanged with said at least one inventory item. For example, the system may learn that the user uses graham crackers and digestive cookies interchangeably. As such, if the sensor input indicates that the user has graham crackers in his pantry, the system would remove 'digestive cookies' from the user's inventory replenishment list.

In some embodiments, the information relates to at least one other inventory item consumed or used together with the inventory item. For example, the system may learn that Theresa always uses peanut butter together with grape jelly. If the sensor input indicates that Theresa bought peanut butter but is low on jelly, the system would automatically order additional grape jelly so that Theresa is able to use the peanut butter she purchased.

As mentioned above, in some embodiments, the user is associated with one or more segments of users, and the learning module 142 may learn segment-specific information over time using machine learning techniques. This segment specific information may be used by processor 140 when processing the received input signals.

In some embodiments, the segment-specific information may relate to a consumption rate of an inventory item by users in the segment. For example, the learning module may learn that users with new born babies use a large number of diapers and wet-wipes. As such, upon identification that a user has a new-born baby (for example by identification of baby products such as new-born size diapers or milk formula), the system may automatically increase the number of wet-wipes ordered by the user.

In some embodiments, the segment specific information may relate to a specific location in the storage area of the inventory item. For example, Lara is a 70 year old woman who drinks coffee every day and buys cookies to give as treats to her grandchildren when they visit. The learning module may learn that people over the age of 65 do not put items used on a daily basis on the low shelves of the pantry. If the input provided by the sensors is insufficient to accurately identify an inventory item on the lowest shelf of the pantry, and the options for identification are coffee or cookies, the system may determine, based on the segment-specific information and the user-specific information, that the identified item is cookies.

In some embodiments, the segment-specific information may relate to a purchasing pattern of an inventory item. For example, the learning module may learn that users who eat Kosher do not purchase bacon. As such, when the system cannot accurately determine whether a product in the refrigerator of the Cohen family is bacon or chicken pastrami, it may use the identification of the Cohen family as being Kosher, together with the segment-specific information, to identify the item as chicken pastrami.

In some embodiments, the segment-specific information may relate to a use pattern of an inventory item. For example, the learning module may learn that vegetarian people often eat beans. This information may be used to accurately identify products, which are not identified clearly by the input provided by the sensors 103.

As mentioned above, in some embodiments the processor 140 may also use item-specific information relating to characteristics of an inventory item, which item-specific information is learned over time using machine learning techniques. The item-specific information may include one or more of:

information relating to one or more dimensions of the inventory item;
information relating to a footprint of the inventory item;
information relating to a color of the inventory item;
information relating to a barcode of the inventory item;
information relating to an expected expiration date of the inventory item;
information relating to a shape of the inventory item; and
information relating to an initial weight of the inventory item.

The following are several examples of various use cases of the system and method described herein.

1. An image of a refrigerator shelf was captured by a camera 104, and showed that a jug of milk was added to the refrigerator (the jug of milk wasn't there in a previously captured image). Processing of the image signal using OCR techniques showed that the expiration date of the jug of milk is Jun. 15, 2017. A calendar signal provided to the processor indicates that the date is Jun. 10, 2017. The processor may then correlate the information received from the camera signal and the calendar signal, predict that the milk will have expired by Jun. 16, 2017, and add 'milk' to the grocery list of the user for purchasing near Jun. 16, 2017.

2. Information collected at 8:00 am, when the refrigerator was opened, showed that there were 8 oz of milk left in the refrigerator. Information collected at 8:10 am, when the refrigerator was closed, showed that there were 6 oz of milk left in the refrigerator. Additional information indicates that at 7:58 am, the coffee was removed from the pantry. Knowing that the user tends to drink coffee in the morning and drinks four cups of coffee a day, the to learning module 142 learns that 2 oz of milk were used for the user's coffee, and the processor predicts that the milk will be finished by the evening and notifies the user (or updates the system) that more milk should be purchased.

3. Information collected by an image sensor indicates that a new spice was added to the spice drawer. However, since all the spices the user buys are made by the same company and have the same box, and since the label of the spice is hidden from the camera 104, the system uses a chemical sensing device, which senses a smell of cinnamon in the spice drawer to determine that the purchased spice was cinnamon.

4. The system has identified that the user has run out of chocolate chip cookies, by identifying, using input from camera 104, pressure sensors 106, and/or USID/RFID sensors, that the cookies are lacking from their place on the pantry shelf and that the package of the cookies was thrown into the garbage can 132. The system then notifies the user that the cookies have run out, and presents an advertisement for a new type of chocolate chip cookies that have recently been released to the market, enabling the user to select purchasing of the new chocolate chip cookies rather than replenishing the inventory of the previous cookies.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention. Section headings are used herein to ease understanding of the specification and should not be construed as necessarily limiting.

The invention claimed is:

1. A method for managing inventory in a storage area of a user, the user being associated with at least one segment of users, the at least one segment of users including a plurality of users sharing at least one common characteristic with the user, the storage area housing a plurality of inventory items and having a plurality of sensors associated therewith, the method comprising:
   receiving at least a first image input signal from a first image sensor of said plurality of sensors and a second non-image input signal from a second, non-image sensor of said plurality of sensors, said first image input signal and said second non-image input signal relating directly to one of said plurality of inventory items in said storage area;
   uniquely identifying said one of said plurality of inventory items based on said first image input signal and said second non-image input signal relating directly thereto, wherein each of said first image input signal and said second non-image input signal is insufficient, on its own, for facilitating unique identification of said one of said plurality of inventory items;
   based on at least one of said first image input signal, said second non-image input signal, and an additional input signal received from a third sensor of said plurality of sensors, as well as on user-specific information learned over time using machine-learning techniques, identifying a change in said one of said plurality of inventory items;
   in response to said identifying said change, automatically purchasing said one of said plurality of inventory items, said automatically purchasing occurring at a time of said identifying or being scheduled to occur at a future time at which said one of said plurality of inventory items is predicted to expire or to be consumed,
   wherein at least one of said uniquely identifying said one of said plurality of inventory items and said identifying said change is further based on segment-specific information for said at least one segment of users, and
   wherein said segment-specific information is learned over time using machine-learning techniques by a machine learning module, based on information received from said user and from other users in said segment of users,
   wherein said segment-specific information is common to at least a majority of users in said at least one segment of users,
   wherein said second sensor is a dynamic pressure sensor, and said second, non-image input signal comprises at least one of:
   a signal indicative of a kinetic wave decay pattern of the content of said package of said one of said plurality of inventory items; or
   a signal indicative of a pattern of material oscillations or vibrations in said one of said plurality of inventory items.

2. The method of claim 1, wherein said user-specific information learned over time includes at least one of:
   information relating to a consumption rate of said one of said plurality of inventory items;
   information relating to a specific location in the storage area of said one of said plurality of inventory items;
   information relating to a purchasing pattern of said one of said plurality of inventory items; and
   information relating to a use pattern of said one of said plurality of inventory items.

3. The method of claim 1, wherein said uniquely identifying said one of said plurality of inventory items further includes using data obtained from a data repository including information about inventory items to uniquely identify said one of said plurality of inventory items.

4. The method of claim 1, wherein said receiving said first image input signal and said second non-image input signal is responsive to at least one triggering event.

5. The method of claim 1, wherein said segment specific information comprises a list of inventory items used by a majority of members of a corresponding segment of users and a list of inventory items excluded by the majority of said members of said corresponding segment of users.

6. The method of claim 1, wherein said segment specific information includes information relating to at least one storage location of at least one inventory item common to a majority of users in a corresponding segment of users.

7. A method for managing inventory in a storage area, the storage area housing a plurality of inventory items and having a plurality of sensors associated therewith, the method comprising:
   receiving a first input signal from a dynamic pressure sensor of said plurality of sensors and a second input signal from a second sensor of said plurality of sensors, said second sensor being different from said dynamic pressure sensor, said first input signal being a kinetic wave decay input signal or a material oscillation measurement signal;
   uniquely identifying one of said plurality of inventory items based on said first input signal and said second input signal;
   based on at least one of said first input signal, said second input signal, and an additional input signal received from a third sensor of said plurality of sensors, identifying a change in said one of said plurality of inventory items; and
   in response to said identifying said change automatically purchasing said one of said plurality of inventory items, said automatically purchasing occurring at a time of said identifying or being scheduled to occur at a future time at which said at least one inventory item is predicted to expire or to be consumed.

8. The method of claim 7, wherein said identifying said change further comprises processing said at least one of said first, second, and additional input signals together with user-specific information learned over time using machine-learning techniques to identify said change.

9. The method of claim 7, wherein the user is associated with at least one segment of users, the at least one segment of users including a plurality of users sharing at least one common characteristic with the user, wherein at least one of said uniquely identifying said one of said plurality of inventory items and said identifying said change is further based on segment-specific information for said at least one segment of users, wherein said segment-specific information is learned over time using machine-learning techniques by a machine learning module, based on information received from said user and from other users in said segment of users, and wherein said segment-specific information is common to at least a majority of users in said at least one segment of users.

10. The method of claim 7, wherein said receiving said first input signal and said second input signal is responsive to at least one triggering event.

11. The method of claim 7, wherein said first input signal is a kinetic wave decay input signal.

12. The method of claim 7, wherein said first input signal is a material oscillation measurement signal indicative of vibrations or oscillations in said one of said plurality of inventory items.

13. A system for managing inventory in a storage area of a user, the user being associated with at least one segment of users, the at least one segment of users including a plurality of users sharing at least one common characteristic with the user, the storage area housing a plurality of inventory items, the system comprising:
   a plurality of sensors functionally associated with said storage area, said plurality of sensors including at least a first image sensor and a second non-image sensor;
   an input module adapted to receive at least a first image input signal from said first image sensor and a second non-image input signal from said second non-image sensor, said first image input signal and said second non-image input signal relating directly to one of said plurality of inventory items in said storage area;
   a learning module adapted to learn user-specific information and segment-specific information, over time, using machine learning techniques, said segment specific information being based on information received from said user and from other users in said segment of users, said segment specific information being common to at least a majority of users in said at least one segment of users; and
   a processor adapted to:
      uniquely identify said one of said plurality of inventory items based on said first image input signal and said second non-image input signal directly related to said one of said plurality of inventory items, wherein each of said first image input signal and said second non-image input signal is insufficient, on its own, for facilitating unique identification of said one of said plurality of inventory items;
      identify a change in said one of said plurality of inventory items in said storage area based on at least one of said first image input signal, said second non-image input signal, and an additional input signal; and
      in response to identification of said change, automatically purchase said one of said plurality of inventory items at a time of said identification or schedule or at a future time at which said one of said plurality of inventory items is predicted to expire or be consumed,
   wherein said processor is adapted to base at least one of said unique identification of said one of said inventory items and said identification of said change on said segment specific information for said at least one segment of users,
   wherein said second non-image sensor is a dynamic pressure sensor, and said second, non-image input signal comprises at least one of:
      a signal indicative of a kinetic wave decay pattern of the content of said package of said one of said plurality of inventory items; or
      a signal indicative of a pattern of material oscillations or vibrations in said one of said plurality of inventory items.

14. The system of claim 13, further comprising at least one light projector adapted to project light in said storage area during operation of at least one of said plurality of sensors, wherein operation of said at least one light projector is triggered by at least one triggering event, which also triggers operation of said at least one of said plurality of sensors.

15. A system for managing inventory in a storage area of a user, the storage area housing a plurality of inventory item, the system comprising:
   a plurality of sensors functionally associated with said storage area, said plurality of sensors including a dynamic pressure sensor and a second sensor, different from said dynamic pressure sensor;
   an input module adapted to receive at least a first input signal from said dynamic pressure sensor and a second input signal from said second sensor, said first input signal being a kinetic wave decay input signal or a material oscillation measurement signal;
   a processor adapted to:
      uniquely identify one of said plurality of inventory items based on said first input signal and said second input signal;
      identify a change in said one of said plurality of inventory items in said storage area based on at least one of said first input signal, said second input signal, and an additional input signal; and
      in response to identification of said change, automatically purchase said one of said plurality of inventory items at a time of said identification of said change or at a future time at which said one of said inventory items is predicted to expire or be consumed.

16. The system of claim 15, further comprising a learning module functionally associated with said processor and adapted to learn user-specific information and segment specific information over time, using machine learning techniques, said segment specific information being based on information received from said user and from other users in said segment of users, said segment specific information being common to at least a majority of users in said at least one segment of users,
   wherein said processor is adapted to identify at least one of said one of said plurality of inventory items and said change also based on said user-specific information and on said segment-specific information.

17. The system of claim 15, further comprising at least one light projector adapted to project light in said storage area during operation of at least one of said plurality of sensors, wherein operation of said at least one light projector is triggered by at least one triggering event, which also triggers operation of said at least one of said plurality of sensors.

* * * * *